(12) United States Patent
Barthelmess et al.

(10) Patent No.: US 8,438,489 B2
(45) Date of Patent: May 7, 2013

(54) SYSTEM AND METHOD FOR DOCUMENT MARKUP

(76) Inventors: Paulo Barthelmess, Renton, WA (US); David McGee, Bainbridge Island, WA (US); Philip R. Cohen, Bainbridge Island, WA (US); Edward C. Kaiser, Portland, OR (US)

( * ) Notice: Subject to any disclaimer, the term of this patent is extended or adjusted under 35 U.S.C. 154(b) by 492 days.

(21) Appl. No.: 12/359,983

(22) Filed: Jan. 26, 2009

(65) Prior Publication Data

US 2009/0193342 A1 Jul. 30, 2009

Related U.S. Application Data

(60) Provisional application No. 61/023,382, filed on Jan. 24, 2008.

(51) Int. Cl.
*G06F 3/00* (2006.01)
(52) U.S. Cl.
USPC ........... 715/751; 715/232; 715/255; 715/221; 715/222; 715/223; 345/179; 382/186; 382/181
(58) Field of Classification Search .................... 715/751
See application file for complete search history.

(56) References Cited

U.S. PATENT DOCUMENTS

| | | | |
|---|---|---|---|
| 6,885,878 B1 * | 4/2005 | Borgstrom et al. | 455/556.1 |
| 7,111,230 B2 * | 9/2006 | Euchner et al. | 715/232 |
| 7,130,798 B2 * | 10/2006 | Williamson et al. | 704/235 |
| 7,137,076 B2 * | 11/2006 | Iwema et al. | 715/863 |
| 7,606,741 B2 * | 10/2009 | King et al. | 705/27.2 |
| 7,974,449 B2 * | 7/2011 | Kitazaki | 382/124 |
| 2002/0085772 A1 * | 7/2002 | Lee | 382/311 |
| 2004/0021700 A1 * | 2/2004 | Iwema et al. | 345/863 |
| 2005/0060644 A1 * | 3/2005 | Patterson | 715/505 |
| 2005/0138541 A1 * | 6/2005 | Euchner et al. | 715/512 |
| 2005/0177389 A1 * | 8/2005 | Rakowicz et al. | 705/1 |
| 2005/0243369 A1 * | 11/2005 | Goldstein et al. | 358/1.18 |
| 2005/0249419 A1 * | 11/2005 | Rieman | 382/229 |
| 2006/0007189 A1 * | 1/2006 | Gaines et al. | 345/179 |
| 2006/0062470 A1 * | 3/2006 | Zhu et al. | 382/186 |
| 2006/0138210 A1 * | 6/2006 | Parkos et al. | 235/375 |
| 2006/0159345 A1 * | 7/2006 | Clary et al. | 382/186 |
| 2006/0182344 A1 * | 8/2006 | Geidl et al. | 382/187 |
| 2007/0118795 A1 * | 5/2007 | Noyes et al. | 715/512 |
| 2007/0143663 A1 * | 6/2007 | Hansen et al. | 715/512 |
| 2008/0181501 A1 * | 7/2008 | Faraboschi et al. | 382/179 |
| 2008/0236904 A1 * | 10/2008 | Zukowski et al. | 178/18.03 |
| 2008/0255882 A1 * | 10/2008 | Chin et al. | 705/3 |
| 2009/0084610 A1 * | 4/2009 | Silverbrook et al. | 178/18.01 |

(Continued)

*Primary Examiner* — William Bashore
*Assistant Examiner* — Reza Nabi
(74) *Attorney, Agent, or Firm* — Richard C. Vershave; Foster Pepper PLLC

(57) ABSTRACT

The system and method as described herein can be advantageously used in a plurality of scenarios, two of which include field markup and data collection and collaborative review. The system and method handles the allocation of digital paper pattern background and the creation of required page definition files embedded into digital paper enabled PDFs. Optionally, action palettes can be automatically overlaid on the drawings as legend boxes to enable field personnel to select the operations they want to perform on the digital paper as they would on a computer interface. For instance letting users select the types of callouts and clouds to add to their markup. These drawings can be printed or plotted onto paper and sent to a work site for markup.

8 Claims, 5 Drawing Sheets

U.S. PATENT DOCUMENTS

| | | | |
|---|---|---|---|
| 2009/0161958 A1* | 6/2009 | Markiewicz et al. | 382/186 |
| 2009/0298026 A1* | 12/2009 | Cohen et al. | 434/236 |
| 2009/0304283 A1* | 12/2009 | Predovic et al. | 382/189 |
| 2010/0011280 A1* | 1/2010 | Cheeniyil et al. | 715/223 |
| 2010/0077316 A1* | 3/2010 | Omansky et al. | 715/751 |
| 2010/0238195 A1* | 9/2010 | McGee et al. | 345/634 |

\* cited by examiner

SYSTEM AND METHOD FOR DOCUMENT MARKUP

PRIORITY CLAIM

This application claims priority to U.S. Provisional Application Ser. No. 61/023,382 filed on Jan. 24, 2008, contents of which are incorporated herein.

BACKGROUND OF THE INVENTION

Adobe Acrobat is a family of application software by Adobe Systems whose applications use Adobe's Portable Document Format (PDF) as their native file format. Some software in the family is commercial, and some free of charge. Adobe Reader (formerly Acrobat Reader) is available as a no-charge download from Adobe's web site, and allows the viewing and printing of PDF files.

Adobe Acrobat and Adobe Reader support redlining by letting users mark regions of a drawing with clouds, text notes, callouts, text notes, stamps, lines, polygons, besides freehand (pencil) annotations. Adobe Reader's markup functionality is operational when documents have their rights/permissions enabled to permit annotation (e.g., via publishing options in Acrobat or LiveCycle Reader Extensions Server).

The PDF document is used in a variety of industries including but not limited to: field users frequently use design drawings (preferably printed from a PDF) to manage day to day work on a work site to ensure construction is executed as designed, or to regularly inspect in-service facilities (e.g. a bridge or a dam or a flood control levee), or to track maintenance and repair work (e.g. replacing a valve or repairing a pump in a process plant). Sometimes photographic records are made (e.g. a stress crack is noticed and then monitored for significance and change). Many of these markups need to be stored or archived as formal records or immediately shared in collaborative review sessions. Currently, in the industry, notes taken must be manually input into a PDF document resulting in possibility of error, a time delay, and/or the destruction/loss of the document.

The PDF document is routinely the file format used in collaborative review. Review sessions are frequently a group activity and the discussions include the expertise of multiple people particularly when addressing and solving design options or problems. Collaborative reviews are not well supported by current technology. Current technology provides participants with printed paper for taking notes, or sometimes one person is attempting to track the discussions and update a master copy. Even when using large computer displays or projections, the design review software is almost invariably single user driven—the software, the mouse and keyboards are all meant to be used by a single user and are not designed to accommodate multiple participants. Instrumented boards such as Smartboards provide an enhanced, but still limited solution. These boards are not portable, and therefore tie users to specific instrumented rooms. Participants wishing to add markups need to stand up and take turns writing on these boards. Paper on the other hand continues to be the material of choice for collaboration. Paper is high-definition and high-contrast. It can be printed cheaply on a variety of sizes, including large formats that make it easy for a group to see and annotate, or on smaller sheets that can be passed around and manipulated for effect. Often, drawings are posted on the walls of a design "war room" for inspection and annotation.

Current systems and methods allow for manual editing of a document and then require a user to interpret and manually enter the changes into a master document resulting in a time delay and errors.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
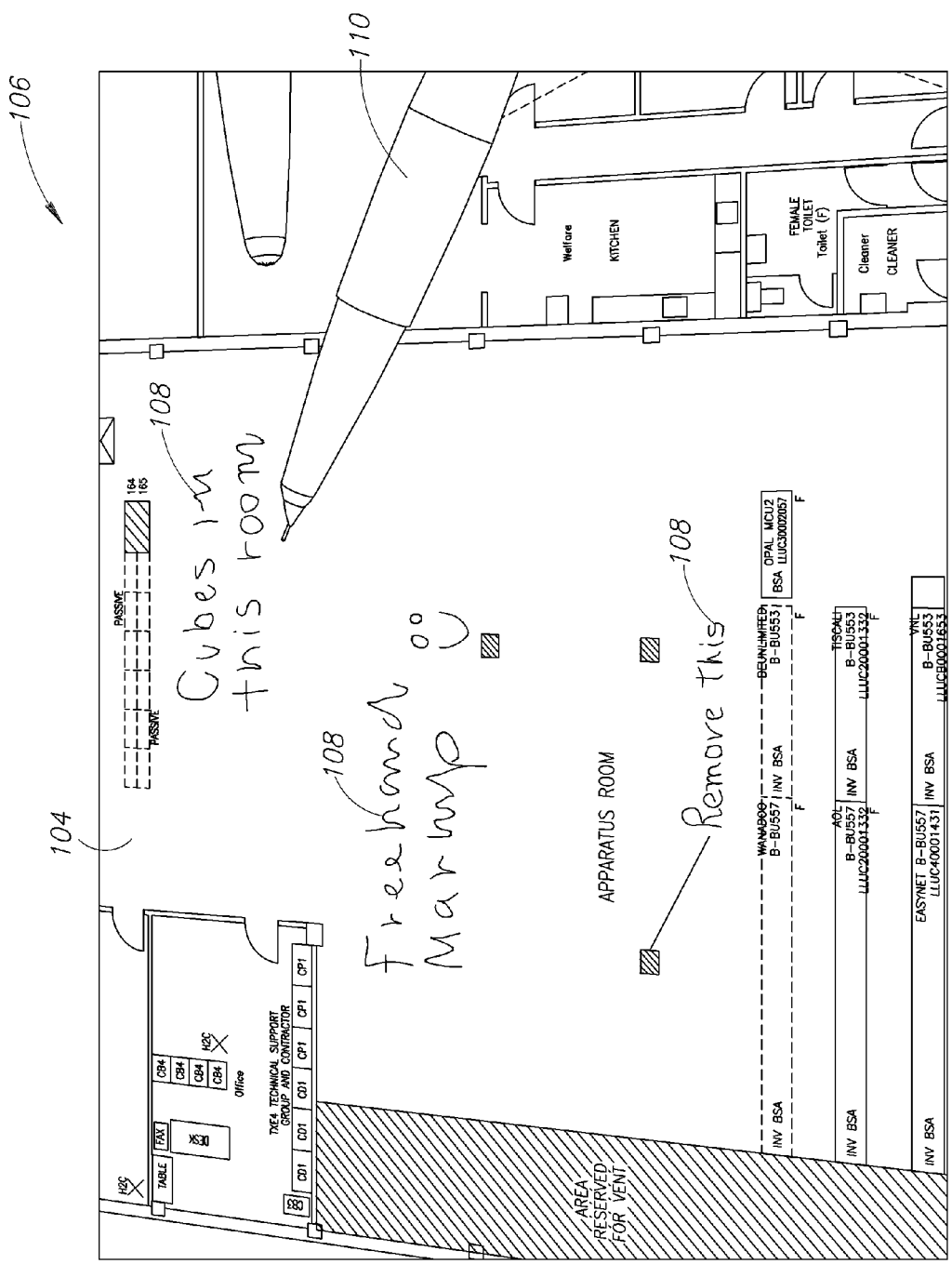
FIG. 1 shows a PDF document printed on digital paper marked up by a user using a digital pen in accordance with one embodiment of the present invention.

FIG. 1 shows a PDF document 106 printed on digital paper 104 marked 108 up by a user using a digital pen 110 in accordance with an embodiment of the present invention.

When users edit a PDF document 106 the edits, redlines and annotations need to be stored and updated either in real time or at the earliest convenience of the user. In order to accomplish annotation that can be uploaded from a document directly to a computer, a digital pen 110 and digital paper 104 are used. The systems and methods as disclosed herein make it possible for users to perform the same kind of redlining using digital pen 110 and paper 104. Exemplary, digital pen 110 and digital paper 104 technology is generally described in U.S. patent application Ser. Nos. 11/751,544 and 11/950,951 both of which are herein incorporated by reference in their entireties.

The system and method collects and converts markups 108 applied to sheets of digital paper 104 into electronic markups for a PDF document 106. In addition to supporting the markup 108 types such as clouds, text notes, callouts, stamps, lines, polygons, and freehand (pencil) annotations, the system and method enables auto fill markup and links to multimedia. Auto fill markup includes: auto clouds which are generally text notes associated with these clouds and are auto-filled according to some user-configurable text. Auto-callouts, which are generally caption content associated to these callouts are auto-filled according to some user-configurable text. Links to multimedia include links to photos, movies, and audio that can be embedded as annotations.

Figure 2:
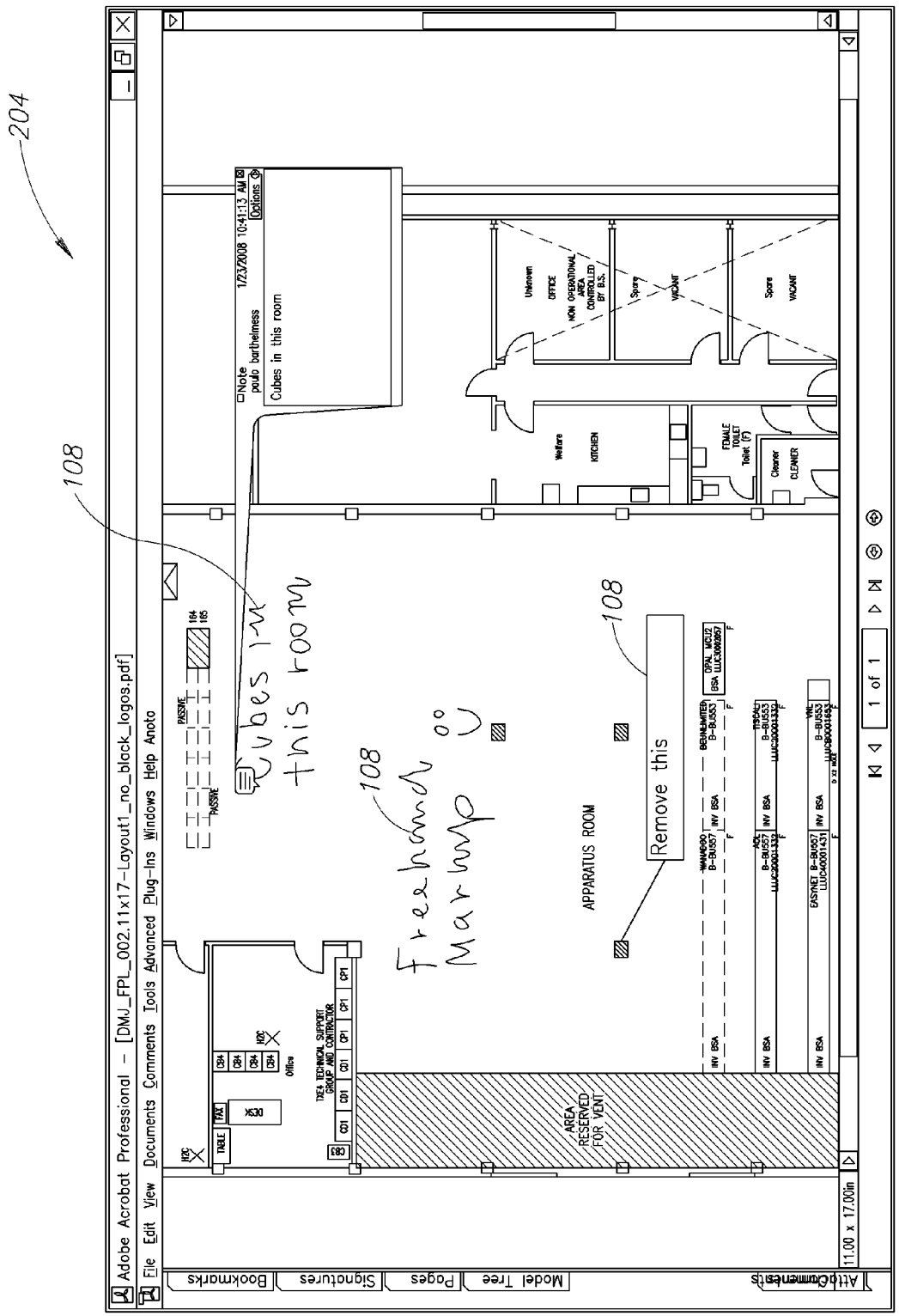
FIG. 2 shows the results of the digital paper markups of FIG. 1 transferred to a computer and displayed in Adobe Acrobat.

FIG. 2 shows the results of the digital paper markups 108 of FIG. 1 transferred to a computer display 204 and displayed in portable document format.

The system and method as described herein can be advantageously used in a plurality of scenarios, two of which include field markup and data collection and collaborative review. The system and method handles the allocation of digital paper pattern background and the creation of required page definition files embedded into digital paper enabled PDFs. Optionally, action palettes can be automatically overlaid on the drawings as legend boxes to enable field personnel to select the operations they want to perform on the digital paper 106 as they would on a computer interface. For instance letting users select the types of callouts and clouds to add to their markup. These drawings can be printed or plotted onto paper and sent to a work site for markup.

A PDF that has been enabled by the system and method described herein can be printed or plotted onto paper. Field personnel are supplied with these digital paper drawings 106 and digital pens 110 (optionally in rugged docking stations for adverse environments or weather). On site, markup is added by writing, as one would write using regular pen and paper and optionally by using action palettes. Advantageously, in addition to the drawing marked up 108 with ink the digital pen 110 now has a faithful digital copy of everything written. In one embodiment, the pen has the capacity for collecting the equivalent of over 40 pages of densely handwritten information in its memory.

The field person can transmit the markup 108 wirelessly via a paired Bluetooth cell phone, or can dock the pen 110 at a computer equipped with the system and method to review their markups 108. The digital markup appears as a standard PDF annotation object, via automated symbol recognition, e.g. beautifying clouds, and transcribing handwritten text. Field note-takers may also import longer notes as PDF text notes. Photographs, movies or audio can be incorporated as "geo-stickies", inserted as geo-located elements in the PDF document. These stickies will contain both the translated text of the note as well as the original handwriting, and appear as hyperlinks embedded in the appropriate locations of the markup.

The systems and methods facilitate the field data collection process by providing mobile capabilities that are compatible with current paper annotation practices that are still used by many organizations.

Figure 3:
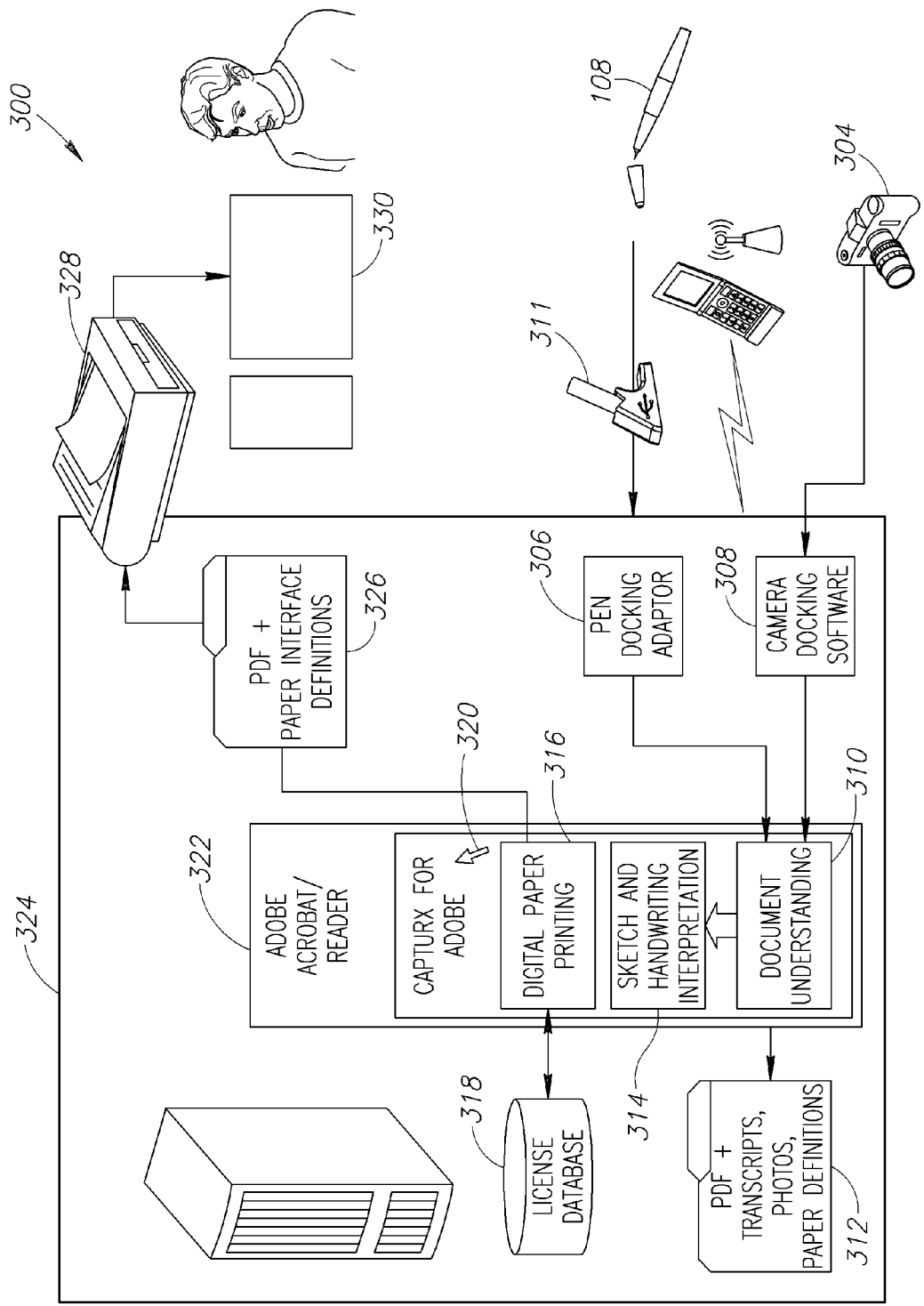
FIG. 3 illustrates a system for document markup in one embodiment.

FIG. 3 illustrates a system 300 for document markup according to an embodiment. The digital pen 108 through a dock 311 and a pen docking adapter 306 connect to a digital medium 324 for transferring digital ink data to a portable document format on the system 300. A program run on the digital medium 324, which is configured to translate digital ink from the digital pen 108, such as Capturx for Adobe 320, which is embedded in a program configured to interact with the a portable document file, such as Adobe Acrobat 322. In alternate embodiments, input devices 304, such as a camera and/or a telephone use docking software 308 to transfer input data to Capturx for Adobe 320. Once the digital ink data and the input data have been input into Capturx for Adobe 320, the data is analyzed at the document understanding step 310 and interactions with PDF transcripts, photos and paper definitions 312. The sketches and handwriting are interpreted at block 314, before printing on digital paper 316. When printing 316 a license database 318 is consulted. PDF and Paper interface definitions 326 are included in the digital paper printing 316 on a printer 328, resulting in a PDF document overlaid on digital paper 330.

Further the system and method advantageously make it easy for users to print to a variety of formats and devices, including large format prints required when multiple participants need to be able to view and interact with a document. Remote participants download and print their own copies of the documents, which makes it possible to add their own markups to the shared annotation during the session.

In one exemplary embodiment, a team of review personnel meet in person (or virtually) to discuss—they group around a table or drawing board on which the paper drawing/s are laid out. All or some of the personnel are supplied with a digital pens paired with a computer via Bluetooth for real time ink transmission. Collaboration is enabled by the capability to support multiple simultaneous pens writing over one or more digital paper documents simultaneously. Ink colors displayed on a shared real time markup viewer are customized to show who added which contribution, based on individual pen identifiers. The discussion ensues with single or multiple pens in use as the design issues are addressed and solved. All markups are written on the drawings, as one would write using regular pen and paper and are captured digitally for each pen.

The markups are uploaded in real time (optionally the pens can communicate wirelessly) or at the end of the meeting the digital pen copies are retrieved as a 'red line layer' in Acrobat or the Reader. The system and method preferably performs automated symbol and handwriting recognition and populates distributed PDFs with standard PDF markup objects.

Digital paper technology makes it possible for groups of co-located and distributed participants to review and annotate multiple documents simultaneously. Real time ink collection and display let groups collaborate in the way that is most natural—seated around a table, or from their own offices, avoiding trip-related delays and costs. Consequently, this use case focuses on increasing the productivity of collaborative design review teams.

Figure 4:
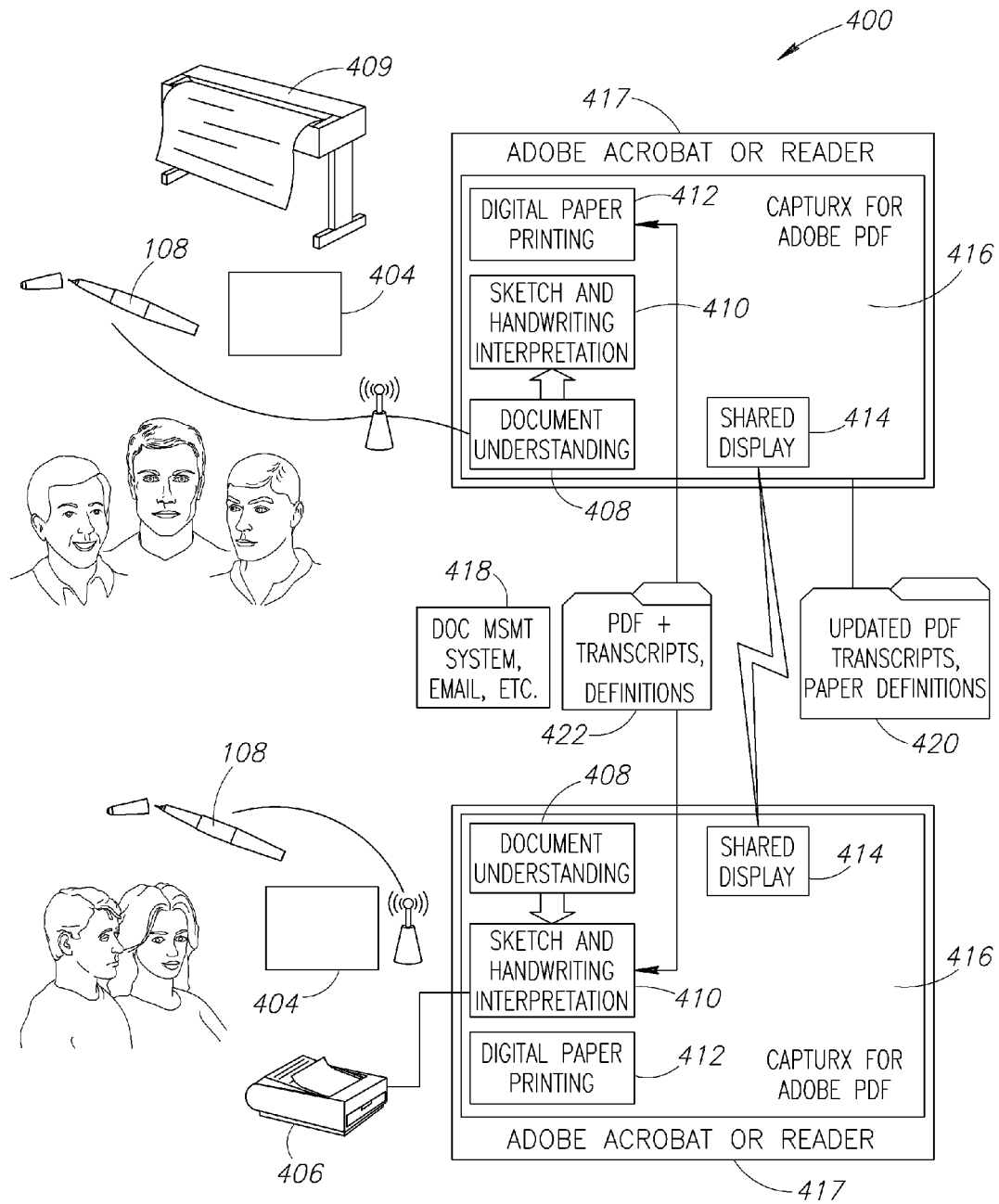
FIG. 4 shows an example of a collaborative review in one embodiment

FIG. 4 shows an example of a collaborative review 400 according to an embodiment. A collaborative review 400 allows for multiple people in multiple locations to view digital pen 108 markups of digital paper 404 on a shared display 414. The digital pen 108 transmits markup data to a program run on the digital medium 324 configured to translate digital ink from the digital pen 108, such as Capturx for Adobe 416, which is embedded in a program configured to interact with the a portable document file such as Adobe Acrobat 417. Capturx for Adobe 416 executes document understanding at block 408, sketch and handwriting interpretation at block 410 and digital paper printing at block 412. Capturx for Adobe 416 provides a shared display 414 that displays all current markups with the digital pen 108 in multiple locations. Capturx for Adobe 416 further interacts with a document management system 418, updated PDF transcripts 422 and PDF and transcript definitions 420. Capturx for Adobe 416 allows for printing digital paper 404 have PDF data on printer 406.

In one embodiment, operation consists of action selection followed by a pen gesture on the document. Actions can be selected by ticking a checkbox on an action palette, via a spoken command, or both. An action palette is a customizable interface element that can be printed on digital paper. This palette has checkboxes for each of the operations that are available to users for a document. To perform an action, the user first ticks the corresponding box on the action palette. During a building inspection, for example, a user may select to add an auto callout action "Sealing Problem" by ticking the corresponding checkbox. The selection of this action can also be accomplished via a spoken "Sealing Problem" utterance when the user is employing voiced commands, or even by the selection of the action via pen while voicing "Sealing Problem". The latter is useful for providing training data for the system's user adaptation algorithms, described in the last section of this document. Once the action has been selected, a pen gesture is used to mark down the region or location the action is associated with, or to provide additional handwritten information. In the case of an auto callout such as "Sealing Problem", all it takes is marking the location of the object e.g. with an "X". To add another markup (e.g. another "Sealing Problem"), just tick the appropriate checkbox again, before moving on to specifying the area. Each action is indicated by a tick in a checkbox or by a spoken command.

The following non-exhaustive list of classes preferably included in the systems and methods disclosed herein. Annotation actions which comprise the common markup actions such as creation of clouds, callout, text notes, polygonal annotations, etc. Auto-filling, which provides quick markup by pre-specifying markup content. Auto Clouds are clouds that have a pre-specified textual content; Auto Callouts are callouts with pre-specified captions. Multimedia linking, which include the incorporation of links to photos, video or audio files. Navigation which is available in interactive scenarios, for instance the collaborative review, allows for users to change what is displayed by Adobe Acrobat/Reader via pen and voice commands. The markup on the document includes marking the cloud region with a circle.

A cloud is preferably activated by ticking the cloud checkbox or by speaking the phrase "add a cloud." Optionally, a user may draw a connecting line and handwrite text. When a cloud annotation is created, the handwritten information, if provided, is converted to text and inserted into a textual popup note associated with the cloud.

A callout is preferably activated by ticking the callout checkbox or by speaking "add callout." Optionally a user may draw a line followed by a handwritten caption. A callout annotation is then created in the specified location. When uploaded the handwritten information is converted to text.

Freehand is preferably created by ticking the freehand checkbox or by speaking "freehand markup." Optionally a user sketches any markup which is recorded until another checkbox is ticked.

Notes are preferably created by ticking the notes checkbox or by speaking "add a note." Optionally a user will handwrite the text of the note. Then the handwriting is converted to text and placed into a text note annotation in a PDF. Preferably a note icon is placed on the top, left corner of the region in which the handwriting occurred.

Stamps are preferably created by ticking the stamp checkbox or by speaking "add a stamp." A user optionally handwrites the content of a stamp. The handwriting is converted to text and a stamp annotation with the text is created in the PDF.

Auto-filling options include auto-callout and auto-cloud. Auto-callout is preferably created by ticking the desired auto callout checkbox. A user marks the location desired on the document, the marking preferably is an "X." The center of the points drawn is used for the location of the auto-callout. Auto-cloud is preferably created by ticking the desired auto cloud checkbox. A user optionally marks an area with a circle. A cloud is created in that area with the pre-specified text inserted into the text note popup associated with the cloud.

Multimedia linking includes filed-notebook links and/or photos, video or audio. Filed-notebook links is optionally activated by a user from an digitally encoded field notebook. When using the notebook, a user ticks the location box on the bottom of the notebooks page. Then on the PDF document, the user marks the location where the note is to be placed. A link to the note is placed at this location. Photos, video or audio are preferably created by ticking the add media link checkbox or by speaking "add media link." A user optionally marks the location on the PDF document where the media will be located. In one embodiment then a user takes a picture, records a movie or audio and then the media is associated with that location.

Navigation commands include show full page, show area, and pan. The navigation commands are used to manipulate a document on a computer using a wireless digital pen and digital paper. Show full area is preferably created by ticking the show full page check box, or by speaking "show full page." Show area is preferably created by ticking the show area checkbox or by speaking "show area." A user optionally indicates the area on the page by writing two "bracketing" gestures. The area within the brackets is centered and zoomed to fit. A pan is preferably created by ticking the pan check box or by speaking "pan." A user optionally draws a line to indicate the direction of panning. The displayed image is panned in the indicated direction. The length of the line indicates how much panning is desired.

The systems and methods as disclosed herein include digital ink uploading and processing. An interactive upload is used in scenarios such as the collaborative scenario described above, one or more digital pens transmit digital ink in real-time over a Bluetooth connection to a computer. Processing and display happens as soon as the digital ink arrives at the computer and is interpreted by the systems and methods. A deferred or batch update is optionally used for field data collections, the digital ink is kept inside the pens memory until a user uploads it to a computer. To upload the ink, a user optionally ticks the "Send to PC" checkbox embedded in the PDF printout. This causes all the collected information to be transmitted wirelessly (via Bluetooth) to a paired computer. Alternatively, a USB dock can be employed.

The system and method provide a mechanism for incremental adaptation to user input. This adaptation takes the form of learning of vocabulary, so that the system is able to perform increasingly better recognition of sketches and handwriting, and also by providing ways for users to extend the set of auto-fill entries, as described in further detail below.

Dynamic Dictionary Expansion includes Out-of-Vocabulary (OOV) words in free-text fields or on forms that cause misrecognitions. The system and method includes a mechanism attached to the correction of any form field that is triggered by corrections in those text fields and adds those corrections to an appropriate lexical resource, so that the next time the word or symbol is used in that field again, it will be recognized.

Figure 5:
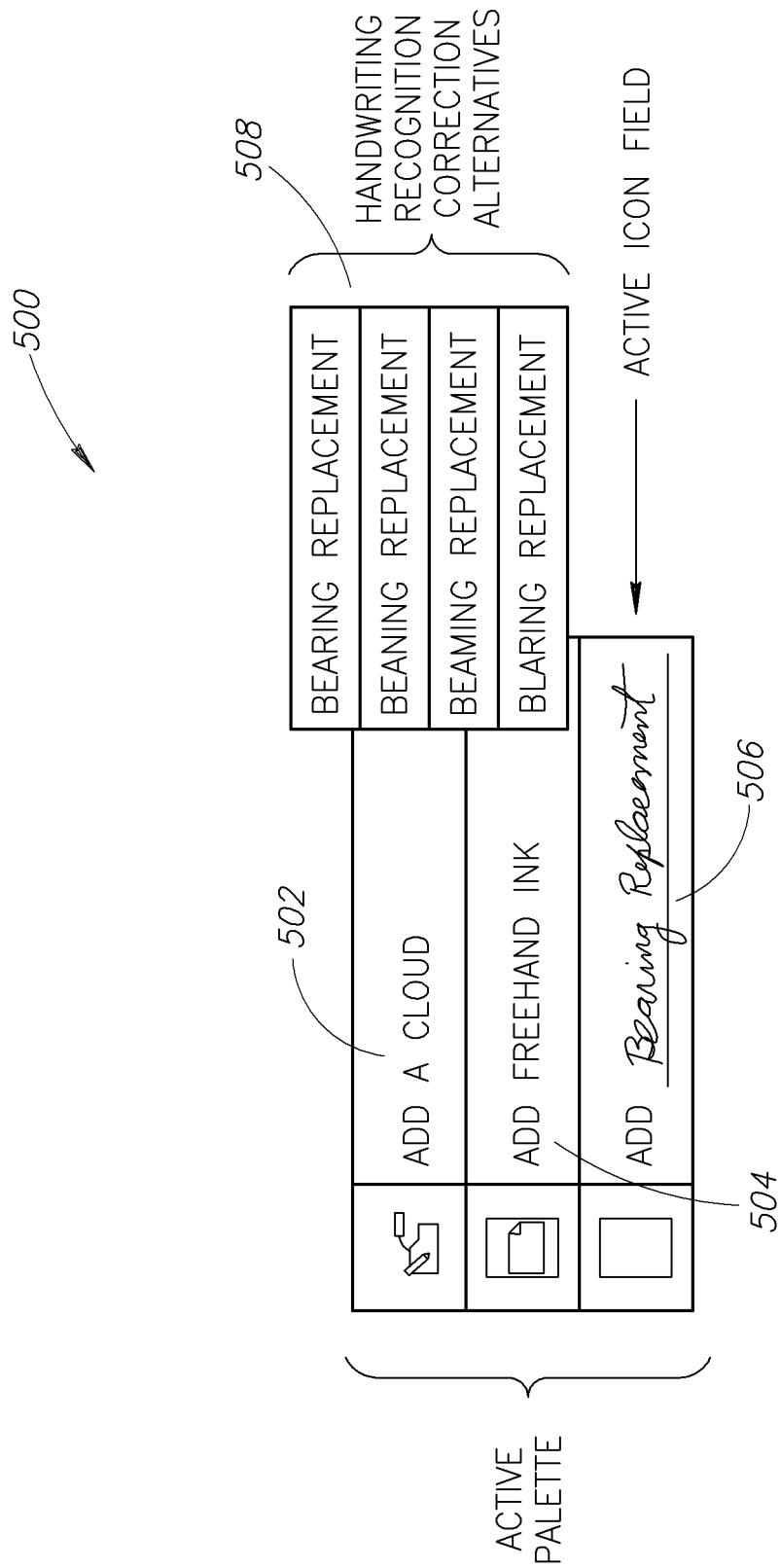
FIG. 5 shows an example of an active palette in one embodiment.

FIG. 5 shows an example of an active palette 500 according to an embodiment. Optionally, active palettes 500 can be overlaid on digital paper as legend boxes. An active palette 500 includes in one embodiment having an add a cloud defined area 502 and an add freehand ink defined area 504. The active palette 500 as shown in FIG. 5 is an icon/command palette that contains an Active Icon Field 506. The Active Icon Field 506 has a blank area in which the label can be handwritten. The handwriting is then interpreted and a Handwriting Recognition Correction Alternatives list 508 is presented. If the handwriting recognition is incorrect the correct alternative can either be chosen from the list or typed in directly. After correction confirmation whenever the Active Icon Field's icon 506 is checked the subsequent ink will designate an area of the type specified by the confirmed handwriting.

Common term weighting includes not only adding new words based on correction input, but also adding weight recognized words in given text fields, either by user or by field. These weightings mean that the words will be pushed up on an alternates list from the recognizer based on the fact of how often they have been seen in that field in the past.

Implicit user training via redundant Action Palette pen selections and voiced commands is provided in one embodiment. Users may improve the system's recognition of spoken commands by speaking while ticking the check boxes of the Action Palette. In this case the voiced input is used to provide voice samples that are used to train the voice command recognizer. The system associates the audio features with the action that has been selected via pen, so that adaptation can occur even in cases in which heavy accents or other speech modifications are present.

While the preferred embodiment of the invention has been illustrated and described, as noted above, many changes can be made without departing from the spirit and scope of the invention. Accordingly, the scope of the invention is not limited by the disclosure of the preferred embodiment.

What is claimed is:

1. A method for collecting and converting sketches carried by a digitally enabled paper product into electronic markups for a document in portable document format, implemented on at least one computer, the method comprising:

overlaying at least one active palette on the digitally enabled paper product, the active palette having an area for receiving handwritten labels that are interpretable by a handwriting recognition program;

for handwritten labels misinterpreted by the handwriting recognition program, generating a list for correction confirmation of the handwritten label, said list comprises at least one alternative interpretation that is selectable by a user;

applying portable document format information to at least a portion of a digital ink pattern on the digitally enabled paper product, which includes a legend having operations that are selectable with a digital pen;

selecting at least one operation from the legend by choosing a checkbox on the active palette, wherein choosing the checkbox includes supplying one of a spoken or ink command;

adding markups to the digitally enabled paper product using the digital pen such that the markups are stored digitally;

uploading the stored markups such that the markups are stored as a portable document format annotation object, and;

distributing the digitally enabled paper product having the portable document format annotation object embedded for review and revision by more than one person, wherein the review and revision is conducted at least contemporaneously wherein selection of the checkbox and correction confirmation by the user triggers subsequent ink designates a location of the type specified by the confirmed handwritten label.

2. The method of claim 1 wherein the active palette further comprises an add a cloud checkbox, that when activated adds a cloud to the digitally enabled paper product.

3. The method of claim 1 wherein the active palette further comprises an add freehand ink checkbox, that when activated adds a new label to the digitally enabled paper product.

4. The method of claim 1 wherein markups further comprise at least one of a cloud, a callout, freehand text, a note, navigation command and a stamp.

5. The method of claim 1 wherein markups further comprise a link to multimedia.

6. The method of claim 1 wherein uploading further comprises uploading the markups wirelessly from the digital pen.

7. The method of claim 1, further comprising storing the at least one alternative interpretation.

8. The method of claim 1 wherein storing the at least one alternative interpretation includes weighting the at least one interpretation such that the at least one alternative interpretation is primarily correlated to the handwritten label.

* * * * *